United States Patent [19]
Fisher

[11] 4,083,523
[45] Apr. 11, 1978

[54] FASTENING DEVICE

[76] Inventor: John L. Fisher, 6133 Coventry Dr., Swartz Creek, Mich. 48473

[21] Appl. No.: 686,563

[22] Filed: May 14, 1976

[51] Int. Cl.² .............................................. F16L 3/08
[52] U.S. Cl. ................................. 248/74 A; 24/73 AP
[58] Field of Search ........... 24/73 AP, 73 SA, 81 CC, 24/156 R, 257 R, 259 C; 174/164; 248/68, 74 R, 74 A, 74 B, 74 PB, 71, 73

[56] References Cited

U.S. PATENT DOCUMENTS

| | | | |
|---|---|---|---|
| 1,148,292 | 7/1915 | Davey | 24/156 R |
| 2,108,347 | 2/1938 | Quarnstrom | 24/259 C X |
| 2,385,209 | 9/1945 | Joyce | 24/259 C |
| 2,712,916 | 7/1955 | Franz | 248/68 R |
| 2,746,112 | 5/1956 | Simon | 24/259 C X |
| 2,778,081 | 1/1957 | Nygard | 24/156 R |
| 3,163,712 | 12/1964 | Cochran | 248/74 PB X |
| 3,245,031 | 4/1966 | Barney et al. | 24/257 R X |
| 3,529,795 | 9/1970 | Van Niel | 248/74 PB X |

FOREIGN PATENT DOCUMENTS

| | | | |
|---|---|---|---|
| 33,153 | 10/1963 | Finland | 24/257 R |
| 1,568,793 | 4/1969 | France | 24/257 R |
| 1,012,983 | 8/1957 | Germany | 248/74 PB |
| 719,416 | 12/1954 | United Kingdom | 248/73 |

Primary Examiner—Lawrence J. Staab
Attorney, Agent, or Firm—Harry R. Dumont

[57] ABSTRACT

An anti-rattle, self-adjusting fastening and holding device for retaining elongated objects of a broad range of different cross-sectional sizes such as wires, cables, tubes, rods and the like. The device includes a plurality of inverse bends to allow retention of the objects over such broad range of sizes.

13 Claims, 7 Drawing Figures

FASTENING DEVICE

BACKGROUND OF INVENTION

Many devices have been employed for holding and securing objects such as elongated members, wires, tubes, cables, rods and the like to a suitable support. The prior devices have presented problems in accomodating objects of different sizes and keeping them snugly secured to prevent rattling. Prior art devices of the single loop or bend type are exemplified by U.S. Pat. Nos. 3,016,220 issued to K. D. Rose on Jan. 9, 1962 and 3,049,585 issued to C. W. Cochran on Aug. 14, 1962. Prior art devices of the multiple loop or bend type are exemplified by U.S. Pat. Nos. 3,074,675 issued to W. F. Brown on Jan. 22, 1963 and 3,163,712 issued to C. W. Cochran on Dec. 29, 1964.

SUMMARY OF INVENTION

The present invention overcomes the problems of prior devices by providing a holding device which includes a unique retaining means which generally curls under itself in a double inverse bend manner and is able to accomodate objects of a range of widely varying sizes while at the same time exerting a positive retaining pressure against the object or objects being retained without being over-stressed and thereby subject to fatigue.

IN THE DRAWINGS

Figure 1:
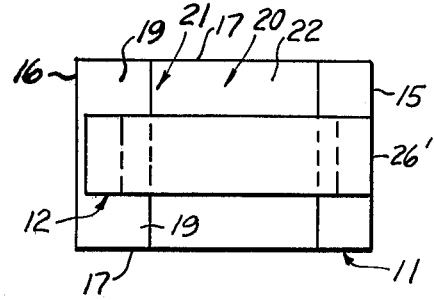
FIG. 1 is a top plan view of one form of the holding device of the invention.
Figure 2:
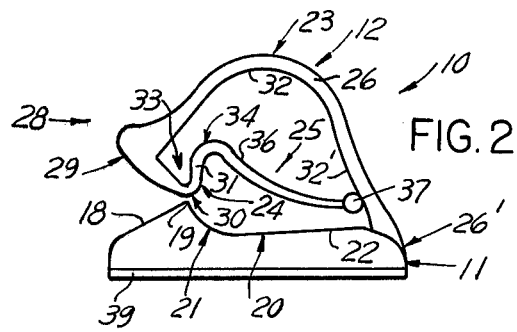
FIG. 2 is a side elevational view of the device of FIG. 1.
Figure 3:
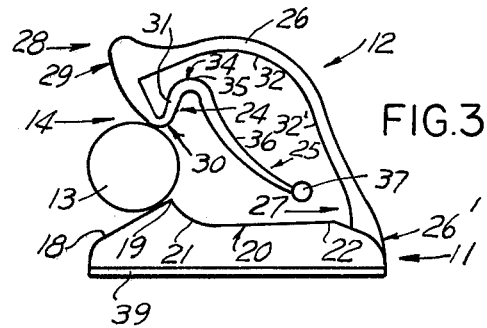
FIG. 3 is a side elevational view showing an object being inserted into the holding device of FIG. 2.
Figure 7:
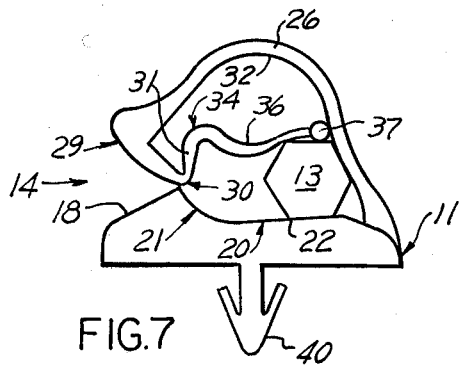
FIG. 7 is a side elevational view showing the holding device retaining an object having a hexagonal cross-section.

Referring now to the drawings, the holding device of the invention shown generally by the numeral 10, may be molded using a resilient plastic such as nylon, acetal (such as E. I. Dupont's DELRIN), or other suitable material to provide resilient and durable springlike characteristics. As shown in FIGS. 1, 2 and 3, the device includes a base 11, and a cantilever mounted retaining means or bracket 12 which urges an object 13 (such as a wire, cable or the like) against the base 11. An object 13 may be inserted between the base 11 and bracket 12 by pushing it through a spreadable throat area indicated at 14.

For purposes of description, the device will be described with the base 11 disposed horizontally as shown in the drawings FIGS. 2-7, although it will be obvious that the base 11 may be mounted in any position. As shown in FIG. 1, the base 11 may be somewhat rectangular in plan view and have a rear edge 15, a front edge 16 and side edges 17.

To aid in the insertion of an object 13, the top front edge 16 of the base 11 adjacent the throat 14 has an inclined plane surface 18 which extends upwardly from the front edge 16 toward the center of the device and terminates at its upper edge in a transverse ridge or apex 19. Inwardly of the apex 19, the base 11 has a concave nesting area 20 to aid in retaining an object in position. The nesting area 20 has a relatively steep incline up to the apex 19 in the nature of a fillet 21. On its lower end, the fillet 21 blends with a substantially horizontal section 22, the latter continuing from the fillet 21 and extending toward the rear edge 15 of the base 11.

Referring now to the retaining bracket 12, as will be noted in FIG. 1, the bracket 12 extends as a band somewhat narrower than the base 11, from a line 26 closely adjacent the rear edge 15 of the base 11. The bracket 12 can extend as a continuous member which includes a first spring means or bend 23, a second spring means or bend 24, and a third spring means 25.

The first spring means or end 23 includes a main or over-arm spring 26 extending upwardly and forwardly from the rear edge 15 of the base 11 (as at 26') in somewhat of a semi-circular arc with the inside included angle between the overarm loop 26 and the base at bend 27 (FIG. 3) generally being an acute angle. At its opposite or moveable end 28, the arm 26 is reversely bent at a substantially right angle to provide a relatively stiff beveled entry nose 29 overhanging the inclined plane surface 18 of the base 11 adjacent the entry throat 14. The nose 29 is inclined downwardly and is wedge shaped gradually reducing in thickness as it extends downwardly and inwardly toward the nesting area 20 of base 11.

At its lower and inner end, the nose 29 connects to a relatively thin sectioned spring hinge 30 of the send spring means or bend 24. The spring means 24 also includes a link 31 connected to the hinge 30. The link 31 extends somewhat vertically and is reversely bent upwardly at the hinge 30 from the nose 29 toward the center of the bracket 12.

Viewing FIG. 2, it will be noted that the link 31 extends toward the underside 32 of the arm 26 and at a generally acute included angle 33 between the inside of nose wedge 29 and the link 31. This results in a barb-like latch at the hinge point 30 which over-hangs and is in close proximity to the base 11 ridge or apex 19 and will be discussed later.

As the link 31 extends away from the hinge 30, it gradually increases in cross-sectional thickness and thus terminates in a relatively stiffer and thicker sectioned acute bend or bight elbow 34 where it connects to the third spring means 25. In other words, the retaining bracket 12 makes more than a 90° bend at the elbow 34 as it diverges into the third spring means 25. From a side view such as in FIGS. 2 and 3 it will be noted that the bracket 12 from its connection to the base 11 at 26', through to its bight elbow 34, takes on the general appearance of a spiral with the bight elbow 34 being somewhat at the center of the spiral. The general arrangement may also be viewed as a pair of inverse loops.

As will be seen in FIGS. 2 and 3, the third spring means 25 may be in the form of a clamping means or leaf finger 36 which extends somewhat horizontally toward the back lower underside 32' of the main spring arm 26 and adjacent the rear edge 15 of the base 11. The finger 36 gradually decreases in cross-sectional thickness as it extends away from the bight elbow 34 and extends convex downwardly and somewhat parallel to the nest area 20. At its free end, the finger 34 terminates in an enlarged tip portion 37. The tip portion 37 is adapted to ride or rub against the inside wall 32' of the main spring arm 26 so as to provide additional restraint against movement of the finger 36 and thereby restrain movement of an object 13 as will be discussed in detail hereinbelow.

When reviewing the restraining bracket 12 in general, it will be noted that it curls under itself so its inner part, such as finger 36 overlays an object 13 being retained and has its extreme free end, as typified by the finger end 37, adapted to engage the underside 32 of the over arm 26. It may alternately be viewed as having a double inverse bend construction including loop 23, loop 24 and terminating spring 25.

To use the holding device 12, an object 13 such as wire, cable or the like may be inserted as shown in FIG. 3 through the throat area 14. As the object 13 is pushed into the device, it will ride upwardly on the inclined edge 18 of the base 11 and also engage the downwardly inclined edge of the nose wedge 29 causing the bracket 12 to be lifted or deflected upwardly. After the object 13 passes over the apex or lip 19 and past the hinge point 30 which are elements generally opposite one another, the object 13 is engaged by the finger 36. In the case of most objects, a snap-action reaction takes place as the center line of the object 13 passes the lip 19 and the barb point of hinge 30, thereby causing the object 13 to snap downwardly under the various and several spring actions of the bracket 12 and quickly travel toward the back of the holding device 10 along the incline of the nesting surface 20.

Figure 5:
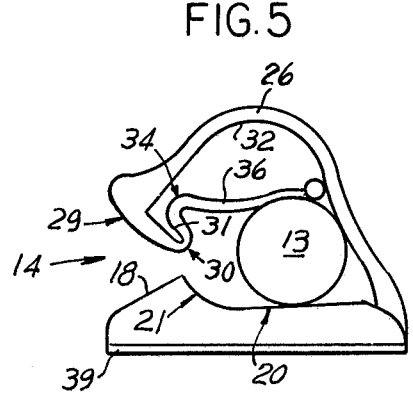
FIG. 5 is a side elevational view somewhat similar to FIG. 4 showing a larger object being retained by the holding device.
Figure 4:
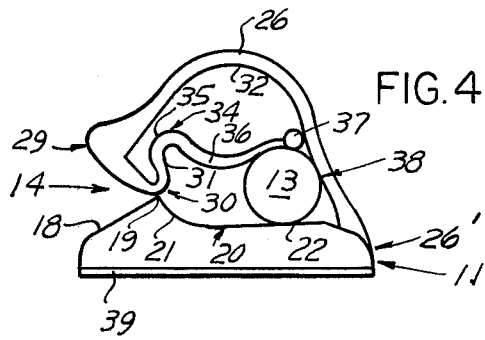
FIG. 4 is a side elevational view showing the object shown in FIG. 3 fully retained in position by the holding device.

Because of its flexible and pliant nature, the finger 36 is able to somewhat take on or follow the contour of the object 13 it engages. This condition is best shown in FIGS. 4 and 5. This finger 36 together with the spring actions of the over-arm 26, the live hinge 30 and bight 34 presses the object 13 toward the nesting surface 20. Since the spring pressure of the finger 36 increases toward the thicker and stiffer bight area 35 of the finger, the object is generally cammed or forced downwardly along the fillet 21. Larger objects are biased toward and into contact with the back underside of the arm in the area 38. This condition is best shown in FIG. 4. Thus, there may be provided somewhat of a three-member contact or confinement, with the finger 36, the arm 26 and the base nest 20 contacting the object 13. Usually only the finger 36 and the nest surface 20 are in contact with smaller cross sectional objects.

As the finger 36 is lifted upwardly by an object, the tip 37 frictionally engages the underside 32, 32' of the arm 26. This provides further resistance against movement and rattling of the object 13. The tip 37 of the finger 36 tends to bend downwardly and thus causes the finger 36 to wrap around the object 13. By extending to the rear underside of the arm 26, the finger 36 generally extends on both sides of the cross sectional centerline of at least one of the objects 13 being retained within the nest area 20.

Accidental displacement of an object 13 from the holding device 10, in a lateral or leftward direction is prevented by the action of the hinge barb 30 which forms somewhat of a closure latch in combination with the base lip 19. As an object 13 moves to the left in FIG. 4, the restraining action is further accentuated since the object must travel up the steeper incline or fillet 21 of the base nest 20 until it reaches the lip 19 and engages the opposed reverse bend of the hinge 30.

Figure 6:
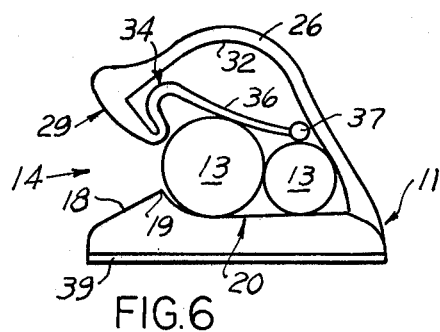
FIG. 6 is a side elevational view showing the holding device retaining a plurality of objects of different cross-sectional area.

As best shown in FIG. 6, several objects 13 of different cross sectional sizes may be held at the same time. Also, as further shown in FIG. 7, objects having other cross sectional shapes than circular may be retained by the holding device 10. Because of its pliant but novel spring like conformability, the finger 36 takes on the general shape of the object it contacts to provide better retention since it is not rigid and does not provide nor only rely on point to point contact as is the case with a rigid or stiff retaining member in the manner known to the prior art.

When a relatively large object 13 is accommodated as in FIG. 5, the finger 36 will be bent upwardly to a greater degree, the link 31 will bend backwardly about the hinge 30, and the main spring arm 26 will also be bent upwardly. In effect, the finger 36, bight 34 and link 31 are also cantilevered about the hinge 30.

While the holding device 10 may be held or mounted by many different means, one satisfactory method has been to use a pressure sensitive adhesive strip 39 on the bottom of the base 11. However, appropriate bolts, studs or clips and the like may also be used as well as a prong type fastening device 40 integrally molded into base 11 which prong is then inserted into a hole.

For purposes of example, in order to obtain the various spring effects of the holding device, the arm 26 may be 0.260 inch wide and in the nature of 0.065 inch thick, the hinge 30 approximately 0.020 inch thick, the bight 34 approximately 0.045 inch thick, the finger 36 (adjacent the tip 37) 0.012 inch thick, and the tip 37 approximately 0.032 inch thick. A holding device so constructed with an initial spacing of the finger 36 above the base nest surface of slightly under ⅛ inch satisfactorily accommodates wires and the like in the diameter range of from ⅛ inch even up to ⅝ inch and ¾ inch depending on the application performance required.

It will thus be obvious that the pressure of the holding device 10 is varied throughout the device by the use of a combination of novel spring means through the use of rigidifying and pliant sections of different cross sectional areas. Obviously, minor variations in size and arrangement of the parts may be restored to without departing from the spirit of the invention.

What I claim is:

1. A holding device for retaining an elongated object comprising:
   a base;
   a bracket mounted in overhanging relation with respect to said base and operable to engage and urge said object into contact with said base;
   said bracket having clamping means for engagement with the object being retained;
   said clamping means being spring-like and pliant both to conform to the shape of the object being retained and at the same time urge the object toward said base;
   said clamping means having a deflectable portion engagable with said object;
   said portion in its free state oppositely bent relative to the periphery of the object;
   said portion in its engaged state and free of external forces being bent by the object itself complementary relative to the periphery of the object.

2. A holding device as claimed in claim 1 wherein said bracket is formed as a continuous band and curls under itself in the nature of a double inverse bend.

3. A holding device as claimed in claim 1 wherein said clamping means extends on both sides of the cross sectional center line of the object being retained.

4. A holding device as claimed in claim 1 wherein said clamping means has a varying cross-sectional area to provide areas of differing pressures along its length.

5. A holding device as claimed in claim 1 wherein said base has a concave portion extending from a lip to aid in preventing an object from being inadvertently removed from said device.

6. A holding device as claimed in claim 1 wherein said bracket curls under itself and said clamping means is adapted to engage the underside of said bracket to provide additional pressure on the object being retained.

7. A holding device as claimed in claim 1 wherein said bracket includes a barb-like area to aid in preventing displacement of the object out of said holding device.

8. A holding device as claimed in claim 1 wherein said clamping means extends over said base and is spaced from said base.

9. A holding device as claimed in claim 1 wherein said clamping means has an unattached free end which gradually decreases in thickness toward its free end.

10. A holding device as claimed in claim 8 wherein said clamping means terminates proximate its free end in a thicker section.

11. A holding device for supporting an object comprising:
   a base;
   a first spring means extending with a bend portion upwardly from said base;
   a second spring means operatively connected to said first spring means and extending downwardly with a bend portion therefrom and a third spring means having a free end and operatively connected to said second spring means, said third spring means being inversely bent in its free state relative to the periphery of said object and being adapted to engage the object proximate its free end and thus urge the object against said base, said third spring means being complementarily bent in its engaged state by the object itself relative to the periphery of the object.

12. A holding device for retaining an elongated object comprising:
   a base; a bracket mounted in overhanging relation with respect to said base and operable to engage and urge said object into contact with said base; said bracket having clamping means for engagement with the object being retained; said clamping means being spring-like and pliant both to conform to the shape of the object being retained and at the same time urge the object toward said base, said clamping means having a deflectable portion engagable with said object; said portion in its free state oppositely bent relative to the periphery of the object, said bracket including a barb-like area to aid in preventing displacement of the object out of said holding device, said barb-like area further serving as a spring-loaded hinge for said clamping means.

13. A holding device for retaining an elongated object comprising;
   a base; a bracket mounted in overhanging relation with respect to said base and operable to engage and urge said object into contact with said base; said bracket having clamping means for engagement with the object being retained; said clamping means being spring-like and pliant both to conform to the shape of the object being retained and at the same time urge the object toward said base, said clamping means having a deflectable portion engagable with said object; said portion in its free state oppositely bent relative to the periphery of the object, said bracket and said base defining an entry throat area between them, said bracket and said base further having means cooperating to provide gradually increasing pressure on the object being retained, the closer the object is to said entry throat area.

* * * * *

UNITED STATES PATENT AND TRADEMARK OFFICE
CERTIFICATE OF CORRECTION

PATENT NO. : 4,083,523
DATED : April 11, 1978
INVENTOR(S) : John L. Fisher

It is certified that error appears in the above-identified patent and that said Letters Patent are hereby corrected as shown below:

IN THE SPECIFICATION

Col. 2, line 20, following "The first spring means or", delete "end" and substitute --bend-- therefor.

Col. 4, line 43, following "arrangement of the parts may be", delete "restored" and substitute --resorted-- therefor.

Signed and Sealed this

Nineteenth Day of September 1978

[SEAL]

Attest:

RUTH C. MASON
Attesting Officer

DONALD W. BANNER
Commissioner of Patents and Trademarks